(No Model.)
N. C. ORRICK.
COTTON SCRAPER.
No. 327,012. Patented Sept. 29, 1885.
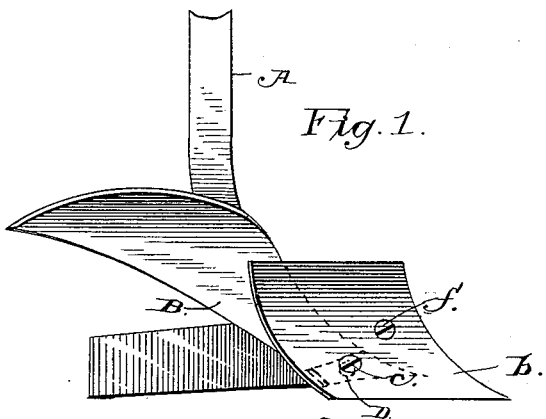
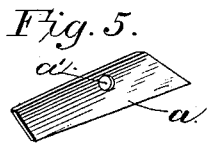
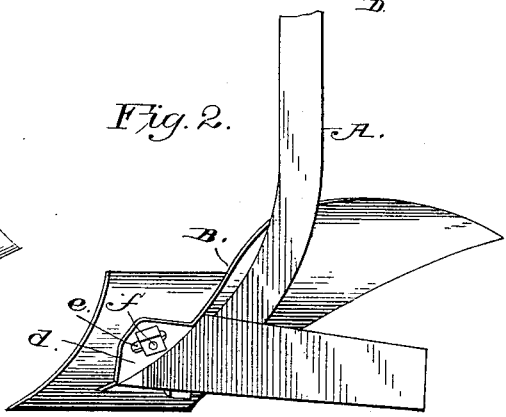
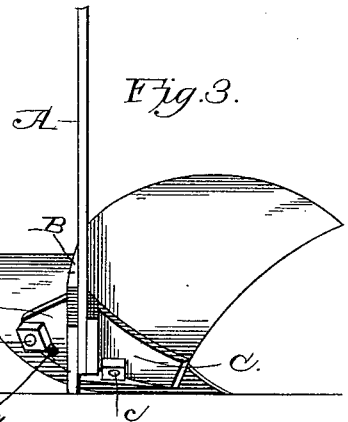
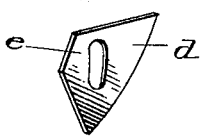
WITNESSES
M. E. Fowler
J. W. Garner
INVENTOR
N. C. Orrick
By his Attorneys
C. A. Snow & Co.

United States Patent Office.

NICHOLAS CROMWELL ORRICK, OF CANTON, MISSISSIPPI.

COTTON-SCRAPER.

SPECIFICATION forming part of Letters Patent No. 327,012, dated September 29, 1885.

Application filed June 17, 1885. (No model.)

*To all whom it may concern:*

Be it known that I, NICHOLAS C. ORRICK, a citizen of the United States, residing at Canton, in the county of Madison and State of Mississippi, have invented a new and useful Improvement in Cotton-Scrapers, of which the following is a specification, reference being had to the accompanying drawings.

My invention relates to an improvement in cotton-scrapers; and it consists in the peculiar construction and combination of devices that will be more fully set forth hereinafter, and particularly pointed out in the claims.

The object of my invention is to produce a cotton-scraper that is adapted to be attached to any ordinary plow, and that can be manufactured and sold at a very low price.

In the accompanying drawings, Figure 1 is a side elevation of a plow with my cotton-scraper attached thereto. Fig. 2 is a similar view of the same, taken from the opposite side. Fig. 3 is a rear elevation. Figs. 4, 5, and 6 are detailed views.

A represents a plow of the ordinary construction. The point or share of this plow is removed, having a projecting ledge, B, on the front side of the mold-board, and a shoulder, C, at the rear side of said ledge. On this ledge is placed a seat, $a$, which is formed of metal, and is adapted to cover the ledge flush with the face of the mold-board.

$b$ represents the cotton-scraper attachment, which is preferably made square or diamond shape, and is concaved on its face, and thus adapted to fit the curve of the mold-board. The edges of the scraper are sharpened to form cutting-edges, and the scraper is attached to the plow by a bolt, $c$, which passes through it and through the opening D of the plow, and through an opening, $a'$, in the seat. A nut is screwed on the under threaded end of the bolt in the usual manner. In all plows, of whatever manufacture, the point is secured by at least one bolt, and consequently the bolt-hole D must exist in every plow, and thereby afford means for the attachment of my scraper thereto.

My scraper is arranged diagonally with relation to the mold-board, and by such diagonal arrangement nearly one-half of the scraper projects laterally beyond the landside, as shown, it being thus perfectly adapted for its designed use.

In order to secure the scraper from working loose on its bolt and turning thereon, I provide a triangular brace-plate, $d$, having an oblique slot, $e$. A bolt, $f$, passes through the projecting portion of the scraper and through the slot $e$, and is secured by a nut on its lower threaded end. The slot $e$ is arranged obliquely in the plate, for the reason that the opening D in different makes of plows is made at varying distances from the landside, and thereby the plate is adapted to be moved similarly to a wedge until it bears against the landside edge of the mold-board, when the nut on the bolt $f$ is tightened, and the scraper is then secured rigidly in place.

When the lower cutting-edges of the scraper become dulled, or are worn away, the scraper can be removed and replaced in a reverse position, thus presenting new cutting edges for use, and thereby the length of time that the scraper can be used is doubled over that of scrapers having only the ordinary cutting-edges.

Scrapers heretofore constructed are adapted for use only in connection with especial makes of plows, and when one becomes worn out or broken, it frequently causes a great loss of time and great inconvenience in getting a new one, as but few dealers have a stock of scrapers for all the varying makes of plows.

My scraper is adapted to be applied to any make of plow having a detachable point, and by its use dealers would be obliged to keep only the one variety in stock, in order to supply the wants of their customers, an advantage possessed by none of the cotton-scraper attachments now in common use.

A cotton-scraper thus constructed is exceedingly cheap and simple, is thoroughly efficient, and is very readily attached to and detached from the plow.

Having thus described my invention, I claim—

1. The combination, with a plow, of the scraper attached thereto, and the brace-plate having the diagonal slot, and the bolt passing through said slot for securing the brace-plate to the scraper, said bolt extending through the slot, and the brace-plate bearing against the landside of the plow, substantially as described.

2. The combination, with a plow having the ledge B, of the seat $a$, the scraper $b$, said seat and scraper being secured to the plow, and the brace-plate $d$, adapted to be secured to the projecting side of the scraper and moved to bear against the landside of the plow, for the purpose set forth, substantially as described.

In testimony that I claim the foregoing as my own I have hereto affixed my signature in presence of two witnesses.

NICHOLAS CROMWELL ORRICK.

Witnesses:
A. P. HILL,
W. E. LEWIS.